Dec. 26, 1961 W. HOBBS, JR 3,014,538
MOUNTING MEANS
Filed Feb. 3, 1959 4 Sheets-Sheet 1
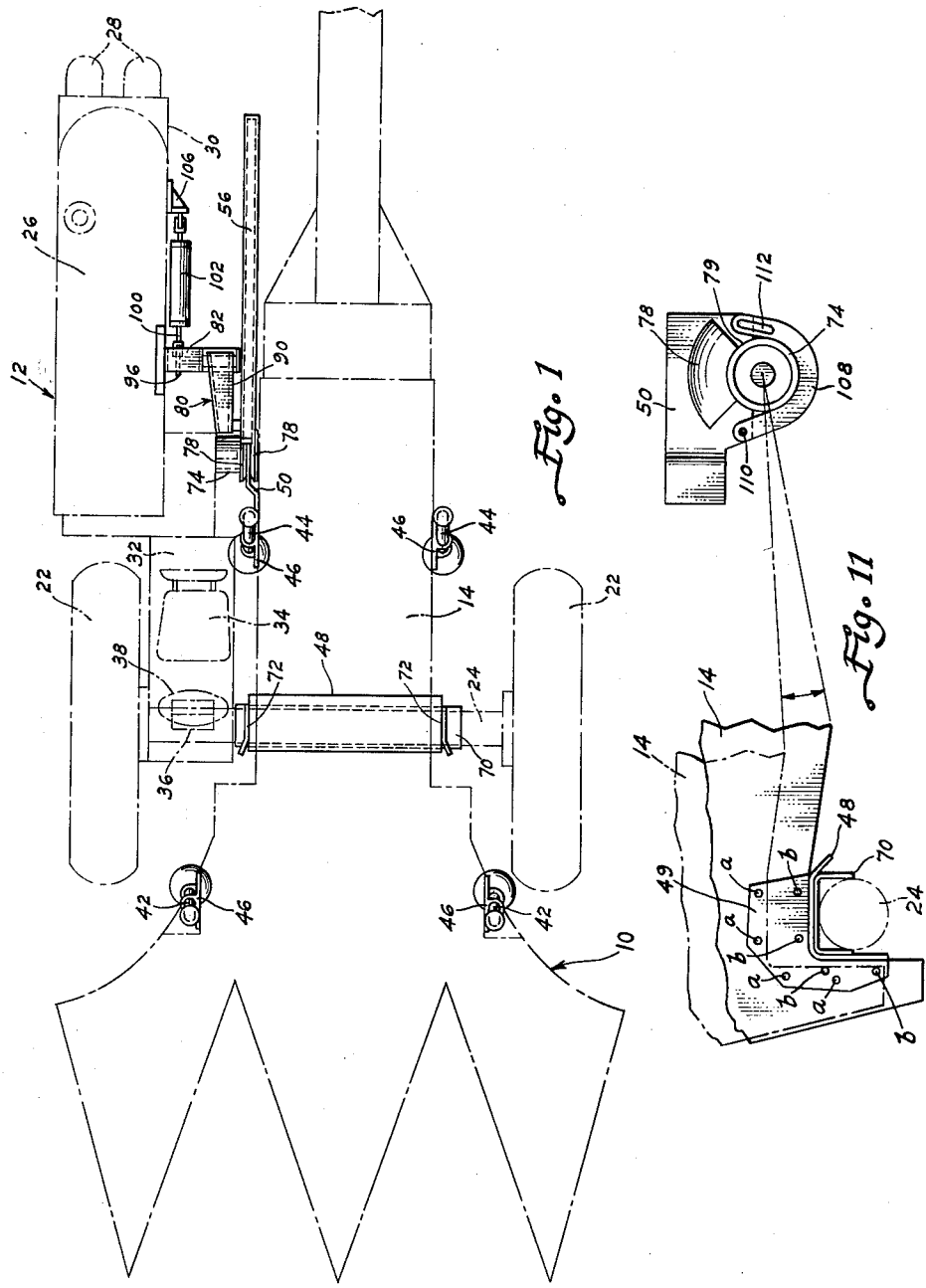
INVENTOR.
WILLIAM HOBBS, JR.
BY
ATTORNEY Dec. 26, 1961 W. HOBBS, JR 3,014,538
MOUNTING MEANS
Filed Feb. 3, 1959 4 Sheets-Sheet 2
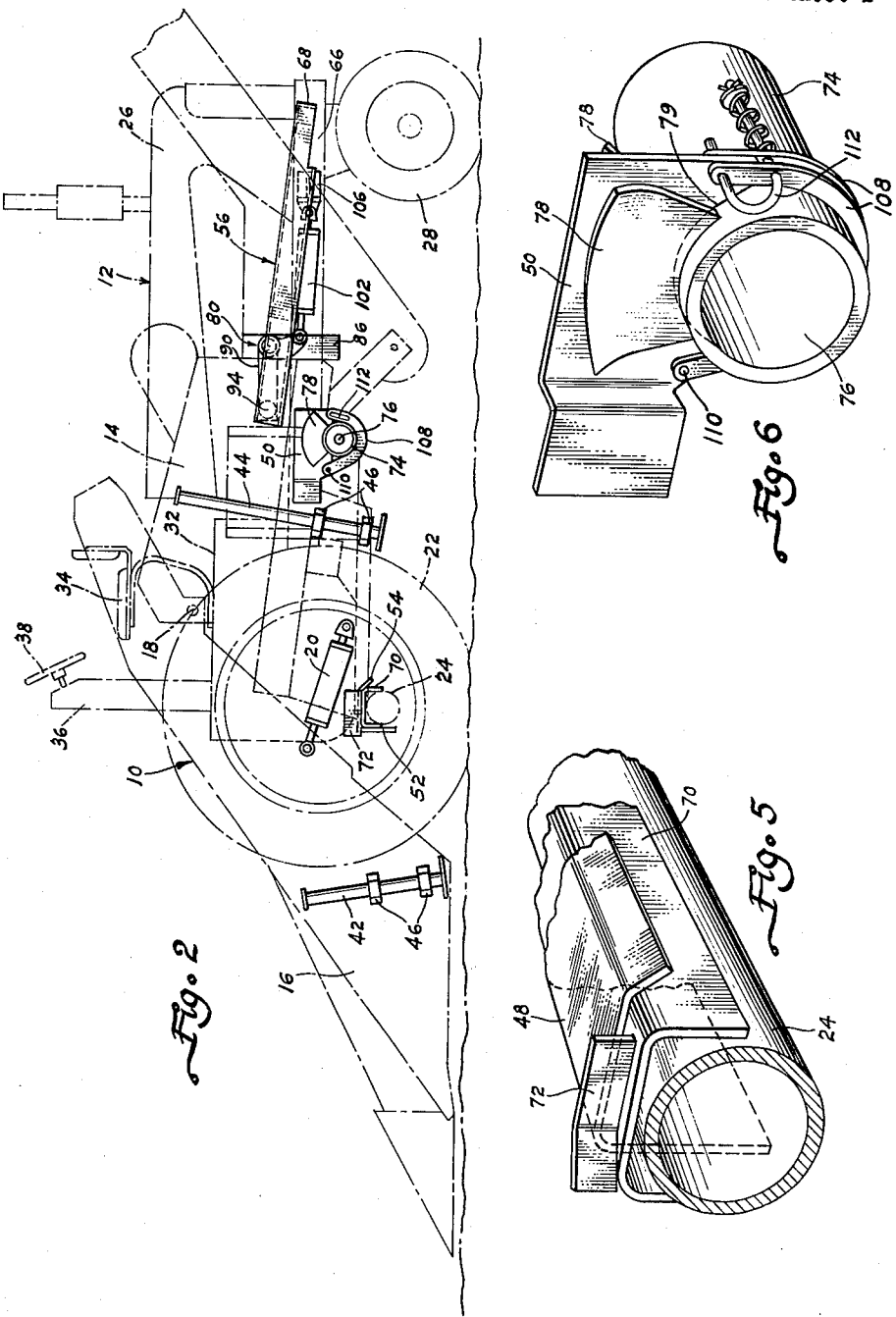
INVENTOR.
WILLIAM HOBBS, JR.
BY
ATTORNEY

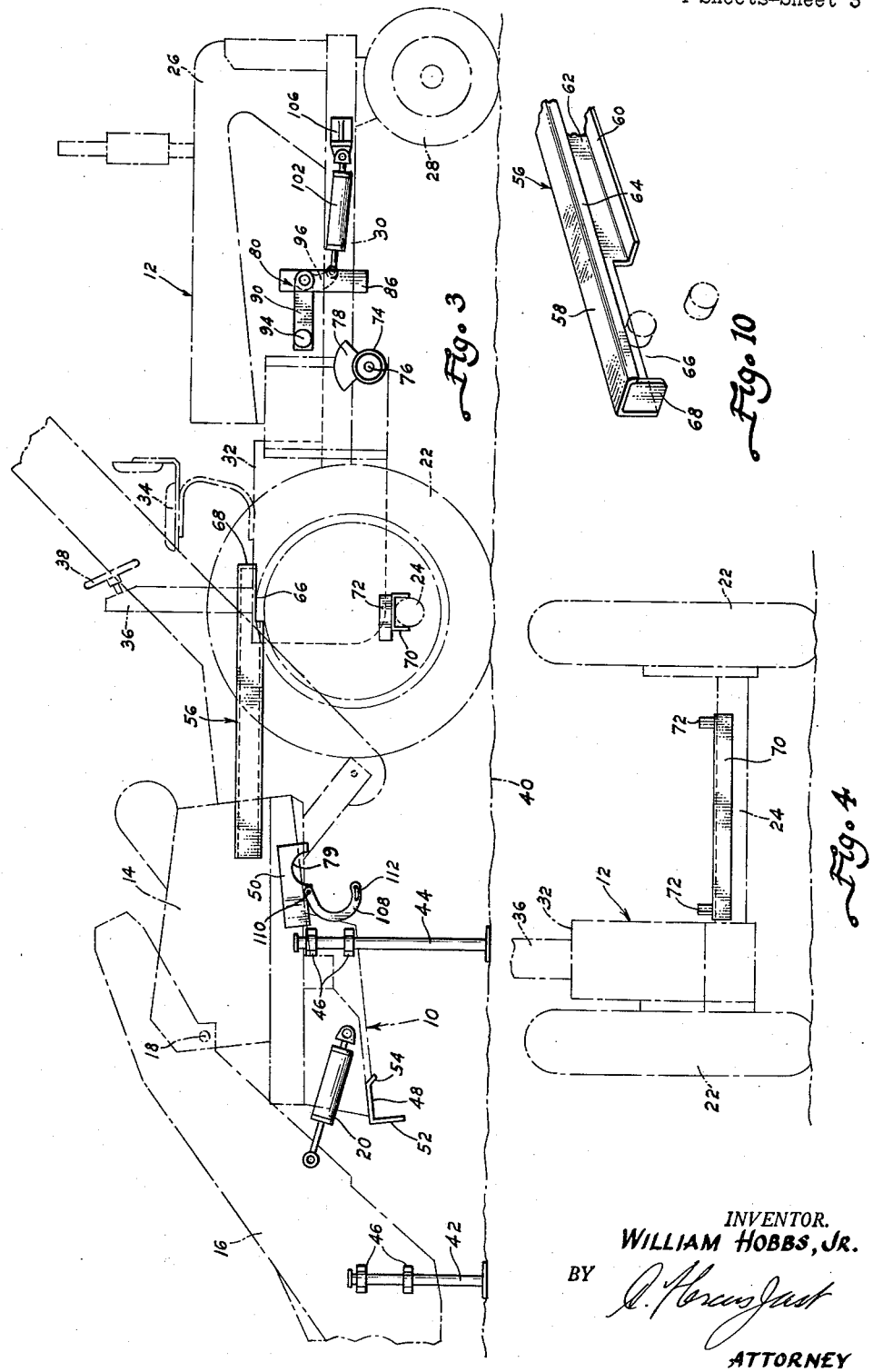

Dec. 26, 1961 W. HOBBS, JR 3,014,538
MOUNTING MEANS
Filed Feb. 3, 1959 4 Sheets-Sheet 4
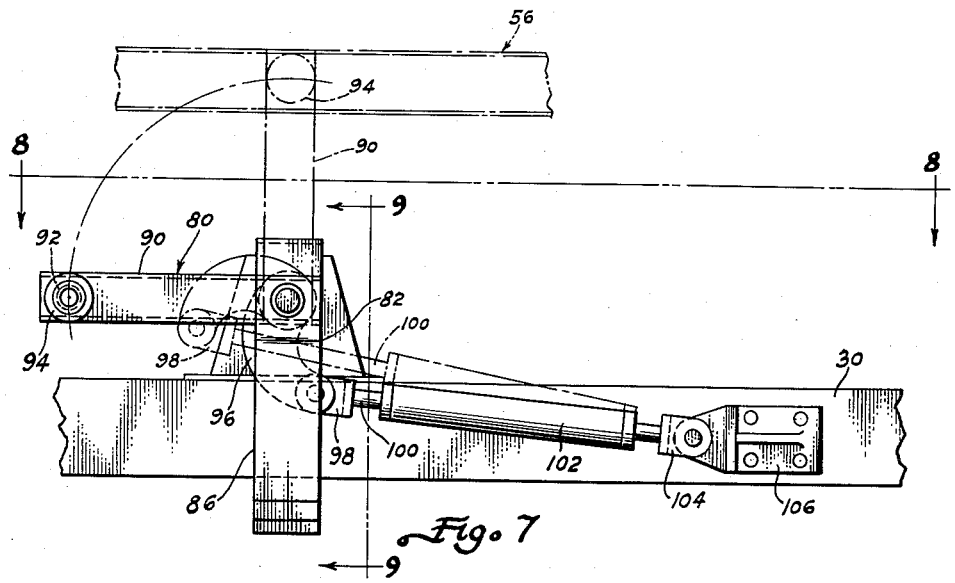
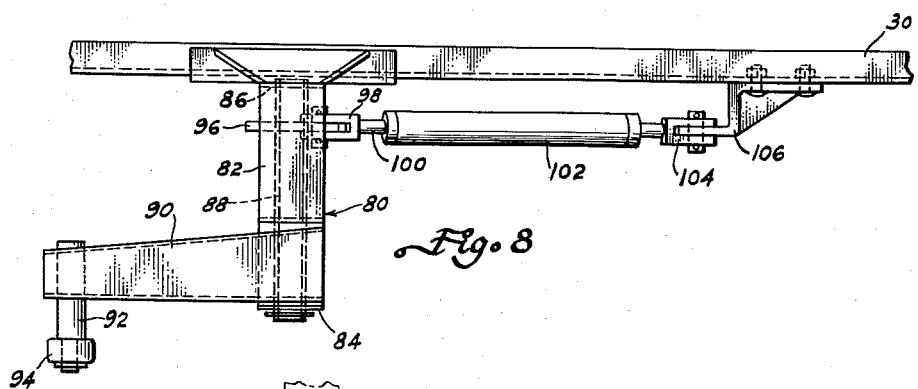
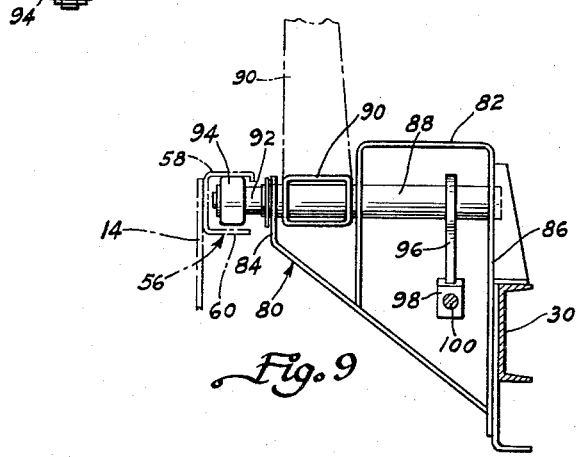
INVENTOR.
WILLIAM HOBBS, JR.
BY
ATTORNEY United States Patent Office 3,014,538
Patented Dec. 26, 1961

3,014,538
MOUNTING MEANS
William Hobbs, Jr., Lancaster, Pa., assignor to Sperry Rand Corporation, New Holland, Pa., a corporation of Delaware
Filed Feb. 3, 1959, Ser. No. 790,866
12 Claims. (Cl. 172—273)

This invention relates to a method and means for quickly attaching or detaching an implement to a tractor or similar power chassis designed to provide a support as well as the propelling and operating means for the implement.

It is common practice at present, relative to agricultural implements, to provide as few tractor or power chassis as possible relative to supporting, driving and operating a substantial number of different kinds of agricultural implements. This practice minimizes investment in powered farming equipment. Such economy is practical, particularly inasmuch as the use of various types of farming implements is somewhat seasonal. For example, corn harvesting usually occurs in the fall season. Cutting silage corps occurs at different times of the growing months with substantial intervals of time in between. Baling hay or other forage crops occurs usually at least a few days after the crops having been cut and sufficient time has been provided to permit the crops to dry prior to baling.

Agricultural implements of the type referred to above are capable of being designed so as to fit upon and be supported by a single tractor or power chassis without substantial sacrifice of efficiency in the tractor or the various implements designed to be connected to and supported by such tractor or power chassis. However, problems occur relative to attaching such implements to and detaching the same from the tractor or power chassis therefor. Such problems arise from the fact that most of the implements of the type enumerated above are of substantial weight, frequently weighing hundreds of pounds. When they are idle, they usually rest upon the ground or upon the floor of a barn or implement shed. After the implement is mounted upon the tractor, it usually is supported entirely by the tractor or power chassis, whereby it is necessary to elevate the implement during the operation of attaching the same to the tractor or power chassis. Similarly, in detaching the implement from the tractor or power chassis, it is necessary to lower the same from the supporting means of the tractor to the ground or floor which is to support the implement when idle.

At present, considerable manual effort, frequently requiring a number of operators, is necessary to attach or detach implements of the type referred to relative to a tractor or power chassis. Further, a substantial amount of time is required to make an exchange of implements relative to a tractor for example, in addition to the backbreaking manual effort usually required. Various types of improvised levers sometimes are used to help elevate the implement into position upon a tractor. Because of the weight of the implement particularly, and the fact that presently used methods require extensive amounts of manual effort, it also is not infrequent that the implements or tractors, and particularly the connecting means thereon, become damaged during attaching and detaching operations. In some instances, various types of frame rigs and winches, as well as wheeled dollies have been employed to facilitate such connection and disconnection but these are not only expensive added equipment but are time consuming to operate.

It is the principal object of the present invention to obviate the difficulties now common-place relative to attaching or detaching implements to and from tractors or power chassis by providing a method and means employing power, as distinguished from manual effort, said power being derived from the tractor and controlled by the operator while stationed at his normal position upon the tractor such as sitting in the tractor seat. Of equal importance is the fact that the method and means afforded by the present invention permits such attachment and detachment of the implement relative to the tractor or power chassis within a few minutes as compared to half an hour or longer presently required by conventional means now employed.

Another object of the invention is to provide methods and means of the type referred to above for attaching and detaching an implement relative to a tractor, for example, wherein means are provided upon the implement for supporting the same upon the ground when idle, and power means provided on the tractor are operable initially to elevate one end of the implement, followed by movement of the tractor toward operative position relative to the implement until coengageable portions on the tractor and implement are substantially in registry with each other, whereupon the power means are further operated to effect a fulcruming of the implement upon support means provided on the tractor to effect complete movement of the implement into full supporting position upon the tractor, the same being accomplished solely by power furnished by the tractor as distinguished from manual effort now required to attach and detach presently used implements.

A further object of the invention is to provide retractable supporting leg means upon the implement which are arranged for movement manually between extended or supporting positions, and retracted or idle positions, the latter being those occupied by the supporting means when the implement is mounted upon the tractor. In regard to this aspect of the invention, the movement of the retractable and extendable supporting means are the only elements of the invention which require manual operation, except possibly for latch means which may be provided to lock the implement in its supported position upon the tractor when the power means have completed the positioning of the implement upon the tractor.

Still another object of the invention is to provide levering means upon the implement projecting, for example, longitudinally of the implement toward one end, and such levering means are engaged by power-operated means upon the tractor initially to elevate one end of the implement from its rest position upon the ground or floor, whereby those ground-engaging supporting means upon the implement which are nearest the elevated end of the implement then may be moved quickly to retracted position to prevent obstruction thereby to the movement of the tractor into closer engagement with the implement to bring into registry supporting and fulcruming means respectively provided on the tractor and implement. The power-operated means on the tractor then are further operated to complete fulcruming of the implement into operative position upon the tractor and the opposite end of the implement is raised from the ground or floor, thereby relieving the other ground-engaging supporting means nearest the opposite end of the implement, whereupon said last-mentioned supporting means may be moved quickly to retracted position thereof in which they remain while the implement is being operated by the tractor.

A still further object of the invention is to provide means by which attachment and detachment of an implement relative to a tractor may be accomplished which are simple, rugged and durable, and easy to operate, principally by power means, the operation of which is controlled by the tractor operator while stationed in his usual position of operation upon the tractor. Detachment of the implement from the tractor is performed by a method in reverse of that by which attachment is effected and the same mechanism is employed in both attaching and detaching an implement relative to a tractor or other type of power chassis designed to support the implement.

Details of the foregoing objects and of the invention, as well as other objects thereof, are set forth in the following specification and illustrated in the accompanying drawings comprising a part thereof.

In the drawings:

FIG. 1 is a top plan view of an exemplary implement shown in attached, operative position upon an exemplary tractor in accordance with the principles of the invention.

FIG. 2 is a side elevation of the exemplary implement attached to the exemplary tractor shown FIG. 1.

FIG. 3 is an exemplary side elevation, partly broken away at one end to foreshorten the view, illustrating an exemplary implement supported in idle position upon the ground and an exemplary tractor is shown in detached position relative to the implement.

FIG. 4 is a front end view of an exemplary tractor, partly broken away at the top to foreshorten the same, illustrating a preferred embodiment of supporting means upon the axle structure of the tractor.

FIG. 5 is a fragmentary perspective view of part of the supporting means illustrated in FIG. 4 but being shown on a larger scale than employed in FIG. 4.

FIG. 6 is a fragmentary perspective view illustrating additional supporting and connecting means respectively provided on the tractor and implement in accordance with the principles of the invention.

FIG. 7 is a fragmentary side elevation illustrating on a larger scale than in the preceding figures the power-operated elevating means provided upon the tractor, these means being shown in full lines in the depressed position thereof and in phantom lines, the same being shown in elevated position in relation to fragmentarily illustrated levering means on the implement.

FIG. 8 is a fragmentary top plan view of the power-operated elevating means upon the tractor as shown in FIG. 7.

FIG. 9 is a vertical end view of the elevating mechanism shown in FIGS. 7 and 8 and illustrating, in phantom, a fragmentary portion of the levering means on the implement, the elevating arm also being illustrated in full lines in depressed position, and in phantom lines, a fragmentary portion of the elevating arm is shown in elevated position.

FIG. 10 is a perspective view of a fragmentary detail of the outer end of the levering means on the exemplary implement and, in phantom, roller means of the elevating mechanism shown in FIGS. 7 through 9 is shown in several different positions occupied thereby during engagement and disengagement of the levering means of the implement by the elevating means of the tractor.

FIG. 11 is a fragmentary side elevation of details of adjustable mounting of the fulcruming means upon the implement to provide for variable vertical positioning of the forward end of the implement relative to the axle supporting means upon the tractor.

In the drawings, the principles of the invention have been shown applied to an exemplary implement comprising a 2-row corn harvester, primarily because such implement is very heavy and unwieldy, awkward to handle, and presents a difficult problem to attach and detach relative to a tractor in accordance with the existing connecting means. The implement is exemplary of a number of different kinds of implements suitable for attachment to a tractor in accordance with the invention. When connected thereto, the implement is supported by a tractor of which an exemplary modern type is shown, this being the type which has a pair of large driving wheels at one end and another pair of closely adjacent, small steering wheels at the other end. In accordance with tractors of this type, however, which sometimes are referred to as a tricycle-type tractor, the tractor normally is driven reversely to conventional tractors in that the small steering wheels trail the large driving wheels when the tractor is going in its normally forward position to propel and operate the implement connected thereto. It is to be understood that the tractor illustrated herein however may be driven in either forward or reverse directions to render it completely maneuverable and is merely exemplary of one form of tractor or power chassis which may be employed to support the implement by attaching and detaching means embodying the principles of the invention. Also, if desired and depending upon the nature of the implement to be mounted upon the tractor, the implement may be mounted thereon to head toward either end of the tractor.

Referring to the drawings in detail, and particularly FIGS. 1 through 4, the exemplary implement 10 and the tractor 12 are shown in phantom so as better to highlight the details of the attaching and detaching means for the same and by which the method of the invention is performed. The exemplary implement 10 comprising a 2-row corn harvester has a body 14, to the forward end of which a header 16 is pivotally connected at 18. Relative desired positions between the body 14 and header 16 are established by means of a hydraulic cylinder unit 20 of conventional construction. The cylinder unit 20 is supplied hydraulic fluid under pressure by flexible conduits or the like, not shown, readily connectable to hydraulic couplings, also not shown, conventionally provided for that purpose and provided in the hydraulic pressure equipment carried by modern tractors.

Referring particularly to FIG. 1, the tractor 12 is shown as being provided with a pair of large driving wheels 22 respectively mounted at opposite ends of an axle housing 24. The engine compartment 26 is mounted substantially in longitudinal alignment with one of the driving wheels 22, and a pair of small steering wheels 28 are supported by one end of the frame 30 of the tractor opposite that end to which the axle housing 24 is connected. The tractor chassis includes an operator's platform 32 which supports a conventional seat 34 adjacent a steering column 36 surmounted by a steering wheel 38. It will be seen that the axle housing 24 extends substantially laterally to one side of the operator's platform 32 to provide considerable space between the frame 30 of the tractor and the outboard driving wheel 22 which is the lowermost wheel shown in FIG. 1. Such space is provided for purposes of accommodating body 14 of the implement 10 when the implement is connected to the tractor.

When the implement 10 is idle, it is supported upon the ground 40 which also may be exemplary of the floor of a barn or implement shed. In the preferred construction of the invention, and particularly to facilitate the attachment and detachment of the implement relative to the tractor, the implement 10 normally is supported in idle position by pairs of forward and rearward jack legs 42 and 44 which, respectively, are fore and aft of the center of gravity of the implement; thus, the implement will be supported by said jack legs firmly upon the ground or floor 40 when the jack legs are arranged in extended position as illustrated in FIG. 3. The jack legs 42 and 44 are connected adjustably and respectively to the header 16 and body 14 by suitable means such as brackets 46 which preferably include conventional locking means to releasably secure the jack legs either in the extended or operative position shown in FIG. 3 or the retracted or idle position shown in FIG. 2.

The body 14 of the implement 10 is provided with a fulcruming means 48 and connecting means 50 which respectively are fore and aft of the center of gravity of the implement 10. The fulcruming means 48 preferably is in the nature of an elongated shoe member which is U-shaped in cross-section, as shown in FIGS. 2 and 3. One leg 52 of the fulcruming means 48 is longer than the other leg 54 thereof for purposes to be described. The connecting means 50 perferably is in the form of a blade or tongue extending horizontally rearwardly from the body 14 of the implement within a vertical plane. Said connecting means is for purposes to be described hereinafter.

The fulcruming means 48 preferably is attached to the body 14 of the implement for vertical adjustment to two or more selective positions. As best shown in FIG. 11, the fulcruming means 48 is a shoe secured to spaced vertical flanges 49 secured to the shoe by welding or otherwise at longitudinally spaced positions upon the shoe so that the flanges respectively will closely fit opposite sides of the body or frame 14 of the implement. The flanges 49 have a plurality of sets of bolt holes respectively indicated a and b in FIG. 11 arranged in patterns corresponding to a single similar pattern of such holes in the sides of implement body 14. It will be seen that, in full lines, the flanges 49 are secured in position upon the body 14 by using holes b, whereby the implement will be in the lowest position when supported upon supporting means 70 on the tractor axle housing 24. When row crops are hilled up for example, and the implement is a harvester which must cut the crops adjacent the top of the hill or row-type mound, the flanges 49 are connected to body 14 by employing the set of holes a therein to connect the flanges to the body. This readily can be done while the implement is supported upon jack legs 42 and 44 in idle position. It will be understood that a set of bolts connect the flanges 49 to the implement and, when these are tightened in securing position, the fulcruming shoe 48 will be connected effectively to the implement in either selected position. Additional sets of holes may be formed in the flanges if additional positions are desired.

Also extending rearwardly from the body 14 of the implement 10 is a levering means 56 which, preferably, is in the form of a U-shaped channel, details of which are best shown in FIG. 10. Said channel thus comprises an elongated channel track and said channel is so positioned that the upper flange 58 and lower flange 60 are horizontal and are connected by the vertical web 62 of the channel. Preferably, the outer edge of the upper flange 58 is bent vertically downward a short distance to provide a keeper web 64 best shown in FIG. 10. Further, the outer end portion of lower flange 60, as well as the lower portion of the outer end portion of the vertical web 62, are removed adjacent the forward end of channel track 56 to provide an opening 66, for purposes to be described. Also, stop means in the form of a plate 68 is fitted into and connected to the outer end of channel track 56. Such stop plate is for purposes to be described.

Referring to the tractor 10 relative to details of the present invention, the axle housing 24 supports an inverted, channel-shaped elongated supporting means 70 which extends a substantial distance along the axle housing 24 as best shown in FIG. 4 and is fixed rigidly thereto such as by welding. Extending upwardly from the upper surface of supporting means 70, adjacent opposite ends thereof, are a pair of guide members 72, the forward ends of which are flared laterally outwardly from each other as best shown in FIG. 1, for purposes to be described.

The tractor 12 also has additional supporting and connecting means 74 mounted thereon in longitudinally spaced relationship to the supporting means 72. For convenience, such additional supporting means 74 conveniently may comprise the housing through which a P.T.O. shaft 76 extends on a conventional tractor of this type. In the specifically illustrated embodiment of the invention, particularly as best shown in FIG. 6, the additional supporting and connecting means 74 also includes a pair of vertically extending, parallel flanges 78 spaced apart a sufficient distance to receive the connecting means 50 of the implement in a manner to be described, the upper ends of the flanges 78 preferably being flared outwardly away from each other as shown in FIG. 6.

Implement elevating means 80, comprising part of the present invention, also are mounted upon tractor 12 adjacent the inboard side of the engine compartment 26 as best shown in FIG. 1. Said elevating means conveniently may be supported by the frame 30 of the tractor and details of the elevating means 80 are best shown in FIGS. 7, 8 and 9. The details of said elevating means comprise a bracket 82 which is fixed to the tractor frame 30 and has an outer vertical ear 84 which is parallel to and spaced outwardly from an inner vertical ear 86 as best shown in FIG. 9. The ears 84 and 86 are provided with horizontally aligned bearing apertures which pivotally support a shaft 88 having an elevating arm 90 fixed at its inner end to said shaft. The outer end of said arm 90 supports a horizontal pintle 92, to the outer end of which an anti-friction roller 94 is rotatably connected. The diameter of roller 94 is such as to fit conveniently between the upper flange 58 and lower flange 60 of channel track levering means 56 as clearly shown in FIG. 9.

Also connected to power shaft 88 for elevating arm 90 is an actuating arm 96, the outer end of arm 96 being pivotally connected to a clevis 98 fixed to one end of piston rod 100 which is reciprocably supported by hydraulic cylinder 102. Fixed to the other end of cylinder 102 is a clevis 104 which is pivotally connected to an ear of bracket 106 which is bolted or otherwise secured to frame 30 of the tractor.

The hydraulic cylinder 102 is double-acting and is connected by suitable flexible conduits to the hydraulic power means which conventionally is provided upon modern tractors but is not illustrated in the present drawings so as to simplify the illustration thereof. It is to be understood also that suitable control means for the hydraulic system connected to the cylinder 102 are positioned within ready reach of the opeartor when seated upon seat 34, for example, as is common practice in various types of such power chassis employing hydraulic operating means.

*Method of operation*

Assuming it is desired to connect the exemplary implement 10 to the exemplary tractor 12, and assuming further that the implement 10 is supported at rest in idle position by the forward and rearward pairs of jack legs 42 and 44 resting upon the ground or floor surface 40, the operator while seated upon the seat 34 will move the tractor 12 in a normally forward direction, toward the left as viewed in FIG. 3, in a longitudinal direction parallel to the longest axis of the implement 10. During such movement, the operator will align by eye as closely as possible the supporting means 70 upon the axle housing 24 of the tractor with the fulcruming means 48 of the implement. Such aligning is facilitated by virtue of the position of the seat 34 relative to the supporting means 70 upon the tractor. Such aligning of the tractor relative to the implement incidentally will be accomplished so as to align the outer end of the channel track levering means 56 relative to the roller 94 of the elevating means 80 upon the tractor. When the roller 94 is disposed directly below the opening 66 in the lower portion of the outer end of channel track levering means 56, the tractor is halted and the operator then operates a control lever or otherwise, not shown, to energize the hydraulic cylinder 102 in a direction to elevate the arm 90 so as to move the roller 94 of the elevating means through the opening 66 of the channel track levering means 56. Continued elevation of the elevating arm 90 causes a fulcruming of the implement 10 about the forward pair of jack legs 42, thereby relieving the rearward pair of jack legs 44 from the weight of the implement. The operator then quickly moves from the seat 34 to elevate or retract the pair of jack legs 44 to the position thereof shown in FIG. 2, in which retracted position they are locked and also connects the conduits of cylinder unit 20 to the hydraulic coupling therefor upon the tractor.

Resuming his position upon the seat 34, the operator then moves the tractor 12 further forwardly, the supporting means 70 on the axle housing passing beneath the lower ends of the retracted jack legs 44, until the supporting means 70 is disposed in registry with the fulcruming means 48 upon the implement. Roller 94 rolls within channel track means 56 during such movement of tractor 12 and keeps the rearward end of the implement 10 elevated. Keeper web 64 of channel track 56 prevents lateral movement of roller 94 from the channel track. The flared guide-members 72 upon the supporting means 70 on the tractor will facilitate the centering of the fulcruming means 48 relative to supporting means 70. Also, the longer leg 52 of the fulcruming means 48 will engage the supporting means 70 on the tractor and thereby indicate to the operator that movement of the tractor 12 then should be stopped. Meanwhile, the rearward or right-hand end of the implement 10, as viewed in FIG. 3, is supported by engagement of the roller 94 with the upper flange 58 of the channel track levering means 56. While in such position, the implement 10 is still supported by the forward jack legs 42 and the fulcruming means 48 on the implement are in somewhat elevated position above the supporting means 70 upon the axle housing of the tractor.

The operator next reverses the hydraulically powered elevating arm 90 so as to cause the same to move in lowering direction, thereby lowering the channel track levering means 56 until the fulcruming means 48 upon the implement rests firmly upon the supporting means 70 upon the tractor axle housing. The downwardly extending, shorter leg 54 of the fulcruming means 48 will depend downwardly over the supporting means 70 on the tractor axle housing. It will be understood that the center of gravity of the implement at this time will be disposed between the supporting means 70 and the additional supporting means 74 on the tractor. The lowering movement of the elevating arm 90 is continued until the connecting means 50 of the implement is received between the vertical flanges 78 of the additional supporting means 74 upon the tractor and the flared upper ends of flanges 78 facilitate such engagement of the blade-like connecting means 50 with the additional supporting means 74 between the flanges 78. Preferably, means 50 is provided with a notch 79 complementary to supporting means 74 and thereby insures accurate longitudinal positioning.

The last described lowering movement of the elevating arm 90 causes a fulcruming movement of the fulcruming means 48 of the implement about the axis of the supporting means 70 upon the tractor axle housing, such supporting means 70 being rugged and readily withstanding such fulcruming movement. As a result of fulcruming the implement about the supporting means 70 on the axle housing of the tractor as described above, the forward jack legs 42 will be relieved from supporting the forward end of the implement 10, whereupon the operator again quickly moves from the seat 34 and elevates the pair of forward jack legs 42 to retracted position such as shown in FIG. 2. In this latter position, the forward jack legs 42 will be locked and thereby offer no obstruction relative to the ground when the implement 10 is being moved under operating conditions by the tractor 10.

When the operations described above have been accomplished, the implement 10 then will fully be supported by the tractor 10 upon the supporting means 70 and additional supporting means 74 of hte tractor. Inasmuch as the center of gravity of most implements will be disposed between said supporting means of the tractor, the implement will rest upon the tractor freely, normally by gravity, whereby except for possible jostling during operation over a field, there is no need for any additional connecting means being required between the implement and tractor. However, the elevating means 80 also may be used as a hold-down means inasmuch as cylinder 102 is double-acting, whereby the center of gravity of the implement may be ahead of the axle of the tractor if desired.

As a safety measure, if desired or necessary, suitable conventional locking pins or clamps may be employed to insure against the accidental displacement of the fulcruming means 48 and connecting means 50 of the implement respectively from the supporting means 70 and additional supporting means 74 of the tractor. Such locking pins or clamping means, while not illustrated relative to fulcruming means 48, may be of any simple, conventional type. Regarding the connecting means 50, a curved strap 108 is shown in FIGS. 6 and 11 which is pivotally connected at 110 to means 50, and the other end is secured to means 50 by a suitable pin 112, whereby the means 50 and strap 108 completely surround the supporting means 74 on the tractor.

From the foregoing, it will be seen that with the exception of the operator having to move from the seat 34 on several momentary occasions to elevate in sequence the pair of rearward jack legs 44 and the pair of forward jack legs 42, all other operations required to connect the implement 10 to the tractor 12 are performed by the operator while positioned in his normal seat upon the tractor and no manual effort is required to effect the complete connection of the implement to the tractor with the exception of elevating the jack legs 42 and 44. Such elevation requires very little manual effort, whereas all elevation and fulcruming operations of the implement relative to mounting the same upon the tractor are performed by the power-operated elevating means 80.

The method of detaching the implement from the tractor is the reverse of the operations described above relative to attaching the implement to the tractor. Briefly, to perform such detaching operations, the header 16 of the implement may first be elevated by the hydraulic cylinder unit 20 to raise the header, for example, to the position shown in FIG. 3, whereupon the operator then lowers the forward jack legs 42 and secures them in lowered position. The cylinder unit 20 then may be locked in position shown in FIG. 3, for example, and the hydraulic supply lines leading from the cylinder unit 20 then are disconnected from the non-illustrated hydraulic coupling carried by the tractor. In the event locking pins are utilized in connecting the fulcruming means 48 and connecting means 70 of the implement, these are next removed and the elevating arm 90 then is raised until the short leg 54 of fulcruming means 48 is moved above the upper surface of supporting means 70 whereupon the connecting means 50 also is disengaged from additional supporting means 74 of the tractor. The tractor then is moved rearwardly, or toward the right as viewed in FIGS. 2 and 3, until the supporting means 70 has moved rearwardly past the pair of rearward jack legs 44.

While the implement is supported by the forward jack legs 42 and the channel track 56 is engaged by roller 94 of the elevating means 80, the rearward jack legs 44 are lowered to the supporting position thereof shown in FIG. 3. Following this, the operator then moves the tractor further rearwardly until the roller 94 of the elevating means 80 is disposed in alignment with the opening 66 adjacent the rearward end of channel track 56. Then the tractor is halted momentarily until the elevating arm 90 is lowered still further to disengage the roller 94 from the channel track 56, the latter remaining stationary by virtue of the support now afforded by the lowered rearward jack legs 44. After the roller 94 has been entirely disengaged from the channel track 56, the tractor 12 then may be moved rearwardly to entirely disengage the tractor from the implement. The implement 10 then is disposed in idle position, supported by the ground or floor 40 until it next is to be attached to the tractor.

Although the preferred arrangement of the elevating means 80 illustrates the same as being mounted upon the tractor, it is within the purview of the invention that such elevating means could be mounted upon the implement and the channel track levering means 56 could be mounted upon the tractor. Under such circumstances, certain flexible hydraulic conduits would be required to extend from the hydraulic cylinder 102 to an appropriate hydraulic coupling carried by the tractor and communicating with the hydraulic power means thereof. Under such circumstances, the hydraulic coupling preferably should be near the forward or left-hand end of the tractor as viewed in FIG. 3 to minimize the length of flexible hydraulic conduits which would be required.

From the foregoing, it will be seen that the present invention provides a method and interconnectable apparatus upon an implement and tractor which enables attachment and detachment of the implement relative to the tractor substantially totally by power means furnished by the tractor, as distinguished from extensive amounts of manual effort now required to attach and detach existing implements relative to existing tractors. In the above-described preferred embodiment of the invention, the retractable supporting jack legs 42 and 44 are operated manually but it is conceivable that even these could be power operated if desired, such as by hydraulic cylinder units, not shown. However, in view of the relative light weight of the legs 42 and 44, no great amount of manual effort is required to extend or retract the same to elevated position.

One of the principal beneficial results of the present invention is that total attachment or detachment of the implement relative to the tractor may be accomplished in a matter of a few minutes, as distinguished from one-half hour or more now required relative to existing mechanisms. The various fulcruming operations employed in the method and apparatus of the invention primarily are responsible for such benefits. Further, the apparatus is extremely simple and production costs are correspondingly low. Firm connection of the implement to the tractor also is provided notwithstanding the simplicity and relatively low cost of the apparatus.

While the invention has been described and illustrated in its several preferred embodiments, and has included certain details, it should be understood that the invention is not to be limited to the precise details herein illustrated and described since the same may be carried out in other ways falling within the scope of the invention as claimed.

I claim:

1. A tractor having supporting means thereon and power operated elevating means, in combination with an agricultural implement having means thereon engageable with the ground to support the same when idle, fulcruming means fixed stationarily on said implement intermediate of the ends thereof, elongated levering means carried thereby, said tractor being movable toward said implement to engage the power operated elevating means thereof with the levering means of the implement and said power operated elevating means being operable to elevate one end of the implement and thereby raise said fulcruming means to a level above said supporting means to permit movement of said tractor and elevating means thereof longitudinally of the levering means of said implement to bring the supporting means of said tractor into registry beneath said fulcruming means on said implement, whereupon said power operated elevating means is movable to lower said fulcruming means onto said supporting means and further to fulcrum said implement upon said supporting means and thereby move another part of said implement into supporting engagement with said tractor to dispose the implement in operative position upon said tractor and thereby elevate said implement entirely from resting upon the ground and mount the implement in operative position upon the tractor, and connecting means on said tractor and implement spaced from said fulcruming and supporting means and releasably engageable with each other to secure said implement in said operative position upon said tractor.

2. A tractor having supporting means thereon and power operated elevating means movable upon said tractor, in combination with an agricultural implement having means thereon engageable with the ground to support the same when idle, fulcruming means fixed stationarily on said implement intermediate of the ends thereof, elongated levering means carried by and projecting longitudinally from one end of said implement, connecting means on said implement spaced longitudinally thereon from said fulcruming means, said tractor being movable toward said implement to engage the power operated elevating means thereof with the outer end of the levering means of the implement and said power operated elevating means being operable to elevate one end of the implement by such engagement with the levering means thereof and thereby raise said fulcruming means to a level above said supporting means and permit movement of said tractor and elevating means thereof longitudinally of the levering means of said implement to bring the supporting means of said tractor into registry above said fulcruming means on said implement, whereupon said elevating means is movable to lower said fulcruming means onto said supporting means and further to fulcrum said implement upon said supporting means into operative position upon said tractor and thereby move another part of said implement into supporting engagement with said tractor and simultaneously move the other end of said implement from resting upon the ground and effect mounting the implement in operative position entirely upon the tractor, and means on said tractor releasably engageable with said connecting means on said implement to secure said implement in said operative position upon said tractor.

3. A tractor having supporting means thereon and power operated elevating means having an anti-friction roller thereon, in combination with an agricultural implement having means thereon engageable with the ground to support the same when idle, fulcruming means on said implement intermediate of the ends thereof, elongated levering means carried thereby and comprising a channel positioned with the flanges thereof horizontal, and connecting means on said implement spaced from said fulcruming means, said tractor being movable toward said implement to engage the roller of the elevating means thereof between the flanges of the levering means of the implement and said elevating means being operable to elevate one end of the implement relative to the other end and permit movement of said tractor and roller of the elevating means thereof longitudinally along the levering means of said implement while the implement is supported at said one end by said elevating means to bring the supporting means of said tractor into registry with said fulcruming means on said implement, whereupon said elevating means is movable in a direction to fulcrum said implement upon said supporting means into operative position upon said tractor to move the other end of said implement from resting upon the ground and mount the implement in operative position upon the tractor, and means on said tractor releasably engageable with said connecting means on said implement to secure said implement in said operative position upon said tractor.

4. A tractor having supporting means thereon and power operated elevating means, in combination with an agricultural implement having means thereon engageable with the ground to support the same when idle, elongated levering means carried thereby, fulcruming means on said implement intermediate of the ends thereof, connecting means on said implement spaced longitudinally from said fulcruming means thereon, said fulcruming and connecting means being fore and aft of the center of gravity of the implement, said tractor being movable toward said implement to engage the power operated elevating means thereof with the levering means of the implement and said power operated elevating means of said tractor being operable to elevate one end of the implement and permit movement of said tractor and elevating means thereof longitudinally of the levering means of said implement to cause the supporting means of the tractor to pass the center of gravity of the implement and register said supporting means with said fulcruming means, whereupon said elevating means is movable to fulcrum said implement upon said supporting means into operative position upon said tractor and thereby raise the other end of said implement entirely from the ground, and additional means on said tractor engageable with said connecting means on said implement to secure said implement in operative position upon said tractor with the center of gravity of the implement disposed between said supporting and additional means on said tractor.

5. A tractor having an axle comprising supporting means thereon and power operated elevating means, in combination with an agricultural implement having means thereon engageable with the ground to support the same when idle, shoe means on said implement intermediate of the ends thereof, elongated levering means carried by the implement in longitudinally spaced relationship to said shoe means, connecting means on said implement spaced longitudinally from said shoe means, said tractor being movable toward said implement to effect engagement of the elevating means thereof with one end of the levering means of the implement and said elevating means being operable to elevate one end of the implement from idle position relative to the ground whereby said tractor and elevating means thereof may be moved longitudinally of the levering means of said implement while supporting said one end of the implement above the ground to bring the axle supporting means of said tractor into registry with said shoe means on said implement, stop means on said shoe means engageable with said axle supporting means to limit movement of said tractor in one direction relative to said implement, whereupon said elevating means is movable to fulcrum said shoe and implement upon said axle supporting means into operative position upon said tractor to raise the other end of said implement relative to the ground and thereby mount the implement in operative position upon the tractor, and additional means on said tractor releasably engageable with said connecting means of said implement when so positioned upon the tractor to secure said implement in said operative position upon said tractor.

6. A tractor having supporting means and power operated elevating means comprising an arm pivotally supported at one end for rotation about an axis transverse to said arm, in combination with an agricultural implement having means thereon engageable with the ground to support the same when idle, elongated levering means extending longitudinally of said implement, fulcruming means on said implement intermediate of the ends thereof, connecting means on said implement spaced longitudinally from said fulcruming means, said tractor being movable toward said implement to engage the outer end of said pivoted elevating arm thereof with the levering means of the implement and said elevating arm being movable about its pivotal axis at one end to engage the other end against said levering means and thereby elevate one end of the implement from idle position relative to the ground while the other end of the implement remains supported by the ground, whereby said tractor and outer end of the elevating arm may be moved longitudinally of the levering means of said implement while supporting said one end of said implement to bring the supporting means of said tractor into registry with said fulcruming means on said implement, whereupon the outer end of said rotatable elevating arm is movable relative to said elongated levering means to fulcrum said implement upon said supporting means into operative position upon said tractor and thereby raises the other end of said implement relative to the ground and mounts the implement in operative position entirely upon the tractor, and means on said tractor releasably engageable with said connecting means of said implement when so positioned upon said tractor to secure said implement in said operative position upon said tractor.

7. A tractor having supporting means on the axle thereof and power operated elevating means, in combination with an agricultural implement having fulcruming shoe means and connecting means spaced longitudinally of each other on said implement, the fulcruming shoe means being intermediate of the ends of the implement and jack leg means carried by said implement for movement between operative supporting and idle positions and positioned fore and aft of said shoe means of said implement, said elevating means of said tractor being engageable with said implement adjacent one end when said tractor is moved toward said implement and said elevating means being operable to elevate said one end of said implement to relieve said jack leg means nearest said end for movement of said jack leg to inoperative position while the implement is fulcrumed upon the other jack leg means and thereby permit movement of said tractor longitudinally toward said implement to bring said supporting means on the axle thereof into registry with said fulcruming shoe means on said implement, whereupon when said elevating means is lowered fulcruming of the shoe means of said implement upon said axle supporting means and elevating movement of the opposite end of the implement is effected to complete the elevation of the implement into operative position upon said tractor and thereby relieve said other jack leg means and permit movement thereof to inoperative position, and additional means on said tractor detachably engageable with said connecting means on said implement to secure said implement operatively upon said tractor.

8. The tractor and implement combination according to claim 4 further characterized by said connecting means on said implement and said additional means on said tractor comprising respectively a substantially horizontal blade disposed within a vertical plane and substantially parallel vertical members spaced apart to receive said blade therebetween and effecting coengagement between said means by gravity when said implement and tractor are operatively connected.

9. The tractor and implement combination according to claim 5 further characterized by said shoe means being U-shaped in cross-section and inverted, the leg of said shoe farthest from said connecting means being longer than the other to form a stop for engagement by the axle supporting means when moving said tractor longitudinally into operative engagement with said implement.

10. The combination set forth in claim 3 further characterized by the lower flange of said channel member being interrupted adjacent the outer end of said member, and stop means on said outer end of said channel member outwardly from said interruption in the lower flange thereof and operable to prevent accidental separation of said roller from said channel.

11. The tractor and implement combination set forth in claim 5 further including means adjustably connecting said shoe means to said implement for variable vertical positioning of said implement relative to said axle supporting means of said tractor when the implement is supported thereon to dispose the forward end of said implement at a selected vertical position relative to crops to be engaged by said implement.

12. The tractor and implement combination according to claim 1 further characterized by said means on said implement engageable with the ground to support the same when idle comprising supporting members connected to said implement respectively fore and aft of the center of gravity thereof for movement between retracted inoperative positions and extended operative positions, said supporting members when in the latter position being sufficiently long to support at least one end of said implement elevated above the ground and thereby position said elongated levering means sufficiently high to be engaged by the power operated elevating means of said tractor when said tractor is moved toward said implement.

References Cited in the file of this patent

UNITED STATES PATENTS

| | | |
|---|---|---|
| Re. 22,991 | Hitchcock et al. | Mar. 23, 1948 |
| 2,401,183 | Pool et al. | May 28, 1946 |
| 2,446,883 | Pool et al. | Aug. 10, 1948 |
| 2,662,459 | Shore | Dec. 15, 1953 |
| 2,667,708 | Gjesdahl | Feb. 2, 1954 |

FOREIGN PATENTS

| | | |
|---|---|---|
| 158,732 | Australia | Sept. 9, 1954 |